United States Patent [19]

Scholtus et al.

[11] 4,068,791

[45] Jan. 17, 1978

[54] HOLDER FOR A WELDING HEAD

[75] Inventors: Christiaan Gustaaf Adolf Scholtus, Oudorp; Willebrordus Cornelis Hoeboer, Amsterdam; Antonius Ruiter, Schagen, all of Netherlands

[73] Assignee: Ultra-Centrifuge Nederland N.V., The Hague, Netherlands

[21] Appl. No.: 640,389

[22] Filed: Dec. 12, 1975

[30] Foreign Application Priority Data

Dec. 23, 1974 Netherlands .......................... 7416810

[51] Int. Cl.² .............................................. B23K 37/02
[52] U.S. Cl. ....................................... 228/45; 228/29; 219/60 A
[58] Field of Search ............... 228/45, 48, 29; 219/66, 219/60 A

[56] References Cited

U.S. PATENT DOCUMENTS

| 2,749,421 | 6/1956 | Mikulak et al. | 228/45 X |
| 3,665,148 | 5/1972 | Yasenschak et al. | 228/45 X |

*Primary Examiner*—Donald G. Kelly
*Assistant Examiner*—K. J. Ramsey
*Attorney, Agent, or Firm*—Birch, Stewart, Kolasch and Birch

[57] ABSTRACT

Holder for a welding head for carrying out welds on the innerside of a substantially closed body, said holder being in the form of an elongated member, the end portion of which is provided with a holding member for the welding head adapted to pivot from an axial position to a radial position, and wherein means are provided for controlling said holding member.

3 Claims, 3 Drawing Figures

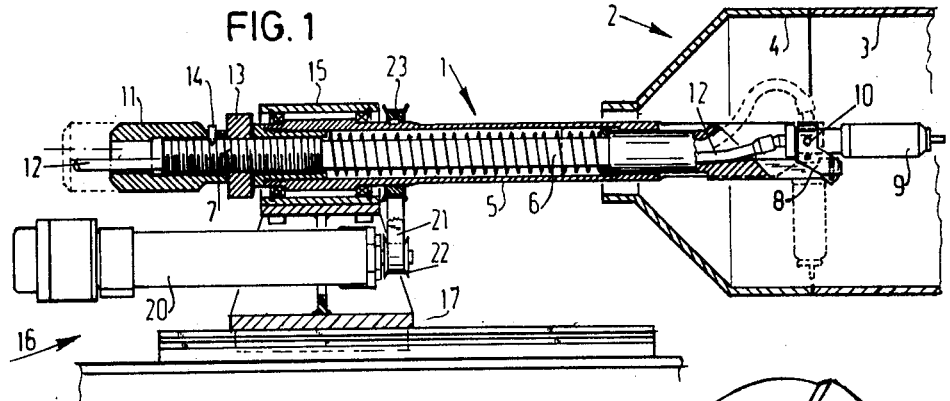
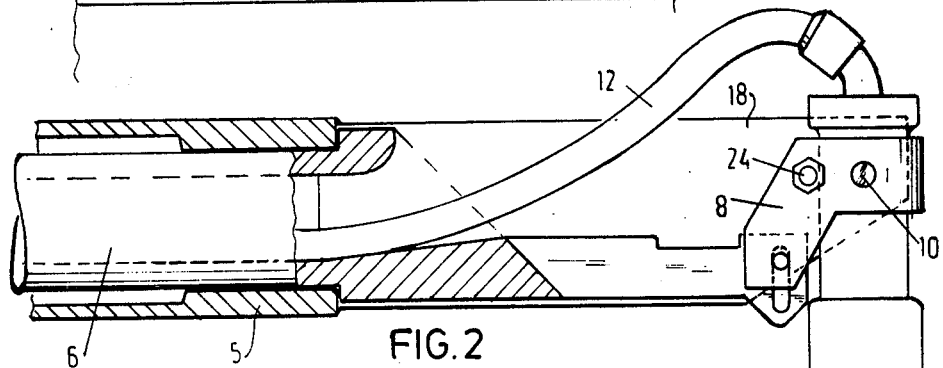
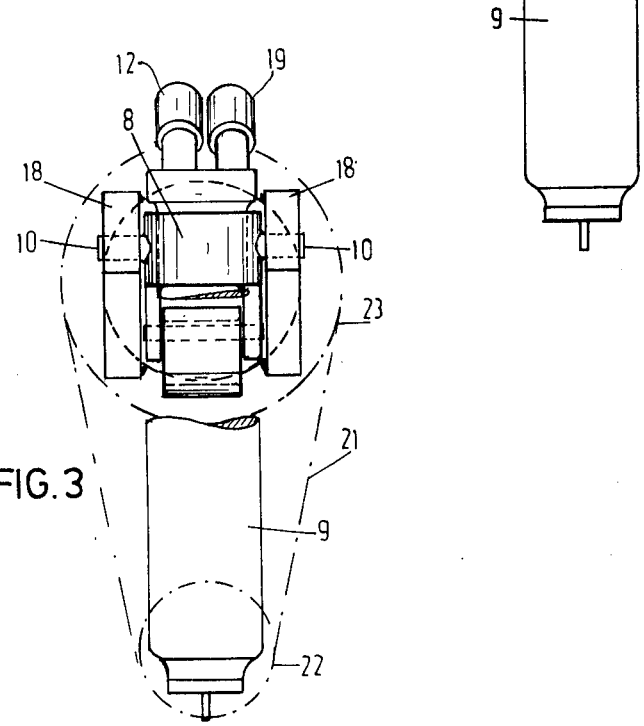

HOLDER FOR A WELDING HEAD

The invention relates to a holder for a welding head for carrying out welds on the innerside of a substantially closed body. When welding on the inner side of a substantially closed body the problem arises that the opening for introducing the welding head into the body may be very small. Thus the permissible section of the welding head to be used is restricted. However, the welding head has to be satisfactorily maniable and it may be difficult to satisfy this requirement in the event of a restricted sectional area.

It is an object of the invention to provide a solution for this problem. According to the invention this is achieved by using a holder in the form of an elongated member, the end portion of which is provided with a holding member for the welding head adapted to pivot from an axial position to a radial position, means being provided for controlling said holding member. Such a holder permits of passing the welding head in an axial position relative to the holder through an opening in the body to be welded, after which with the aid of the control means it can be swung into a radial position so that it can approach the welding area.

In a preferred embodiment of the invention the elongated member consists of a sleeve, whilst the holding member is formed by an angle-section iron adapted to rotate with respect to the sleeve, whereas the control means are formed by a rod axially movable in the sleeve and connected with the angle-section iron. Positioning the welding head in a substantially closed body may give rise to difficulties so that it is preferred, in order to position the holder relatively to the work piece, to accomodate the sleeve of the holder in a housing connected with a carriage provided with a device for measuring displacements and adapted to move with respect to the work piece to be welded. Since the position of the carriage relative to the work piece can be accurately defined, it is possible to position the welding head inside the practically closed work piece from the outer side.

The invention will be described in detail with reference to the drawings of one embodiment.

In the drawing shows:

FIG. 1 a longitudinal sectional view of a holder in accordance with the invention, FIG. 2 shows on an enlarged scale part of the holder of FIG. 1, and FIG. 3 is a front view of the holder of FIG. 2, some parts being partly broken away.

The holder 1 according to the invention can be introduced into a work piece 2 to be welded, which is formed as shown in FIG. 1 by a cylindrical body 3 having a flaring end portion 4. The holder 1 comprises an elongated member in the form of a sleeve 5, in which a rod 6 is axially movable, the end remote from the work piece 2 having a screwthread 7, whereas its other end is connected with an angle-section iron 8, which serves as a holding member for the welding head 9. By the pin 10 the angle-section iron 8 is pivotally connected with the sleeve 5. The rod 6 can be axially moved by exerting an axially directed force on the button 11. The holding member 8 then turns around the pin 10 and the welding head 9 is moved into the radial position. In FIG. 1 this position is indicated by broken lines.

For the supply of welding material and/or protective gas the welding head 9 communicates with the flexible duct 12. The rod 6 can be fixed in place by means of the safety nut 13, which is displaceable along the screwthread 7 of the rod 6. The button 11 is coupled in an axial sense with the rod 6 by means of the pin 14. The sleeve 5 is accommodated in the housing 15, which is connected with a positioning device 16, in which means are provided for measuring the displacement of the movable carriage 17. By measuring the displacement of the carriage and hence the position of the holder with respect to the work piece 2 the position of the welding head 9 inside the work piece can be determined.

The carriage 17 is provided with an electric motor 20, which is coupled by means of a rope 21, pulleys 22 and 23 with the sleeve 5. By rotation of the motor 20 the sleeve 5 is turned such that the welding head 9 performs a circular movement on the inner side of the working piece 2.

FIGS. 2 and 3 show in particular that the pin 10 is rotatable in a frame 18, which is connected with the sleeve.

For the supply of welding material, FIG. 3 shows a second lead 19. It will be obvious that the number of these leads is optional. With respect to the holding member 8 the welding head 9 is adjustable by means of the bolt 24 so that the radius of the welding head can be adjusted at will.

What we claim is:

1. A welding head positioner for carrying out welds on the inner side of a substantially closed, narrow body which comprises a carriage provided with a mounting, an elongated, motor-driven cantilever sleeve-like member rotatably positiond within said mounting, a hollow, rod-like member slidably disposed within said sleeve-like member, a frame consisting of two lengthwise side-by-side arranged flats fixed to the cantilever end of said sleeve-like member and pivotly supporting therebetween a holding member having on opposite sides thereof protruding stub-like pins turning in holes provided in said flats, said holding member fixedly carrying within it a welding head, pin and slot linkage means acting between said rod-like member and holding member, said linkage means serving to pivot said holding member responsive to axial, sliding movement of said rod-like member, the welding head being pivotable from an axially directed position to a radially directed position by the axial displacement of the rod-like member inside of the sleeve-like member.

2. The welding head positioner according to claim 1, wherein the rod is spring-biased by a helical spring disposed around the rod-like member and pressed against an internal ridge in the cantilever end of the sleeve, said spring-bias tending to pivot the welding head into the axial direction.

3. The welding head positioner according to claim 2, wherein the pivoted position of the welding head is effected by the exact fixing of the position of said rod-like member relative to said sleeve-like member by adjusting a nut screwed onto the said rod-like member and resting against the nearest end of the sleeve.

* * * * *